April 2, 1957 C. H. GRAHAM 2,787,768

COOLING APPARATUS FOR ELECTRICAL EQUIPMENT

Filed Feb. 3, 1955

INVENTOR.
CHARLES H. GRAHAM

BY

Campbell, Brumbaugh, Free & Graves

ATTORNEYS.

United States Patent Office 2,787,768

Patented Apr. 2, 1957

2,787,768

COOLING APPARATUS FOR ELECTRICAL EQUIPMENT

Charles H. Graham, Atlanta, Ga.

Application February 3, 1955, Serial No. 485,914

8 Claims. (Cl. 336—57)

Figure 1:
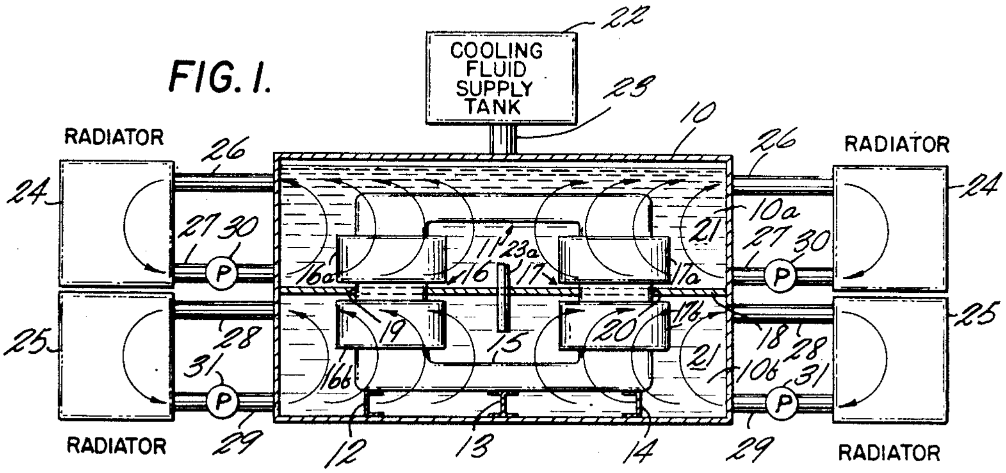

This invention relates to apparatus for cooling power carrying coils, and has particular reference to cooling such coils in transformers.

The power capacity of electrical equipment is determined to a great extent by the temperature attained by power coils and, in particular, by the permissible temperature of the hottest spots on such coils. In tank mounted transformers in which cooling fluid is circulated, the temperature of the hottest spot on the windings depends upon the temperature of the cooling fluid at that point and this, of course, is proportional to the amount of heat absorbed by the cooling fluid in its passage over the coils to the point in question. It will be obvious that the greater the length of the coils to be cooled, the hotter the cooling fluid will be when it reaches the end of such coils. This phenomena makes for undesirably low power ratings for transformers unless some other means is used to reduce the temperature of these hot spots on the coils.

Accordingly, it is an object of the present invention to provide apparatus for efficiently cooling electrical power handling apparatus which includes power carrying coils.

It is another object of the invention to provide an improved cooling system for a transformer contained in a cooling fluid filled tank.

It is a further object of the invention to provide a cooling system of the above character in which the tank is divided into a plurality of compartments and the transformer coils are divided into subwindings suitably poisitioned in such compartments.

It is yet another object of the present invention to provide a cooling system of the above character in which means are provided for circulating the cooling fluid in each of the compartments and through cooling means adjacent to the tank.

These and further objects of the present invention are accomplished by disposing the electrical apparatus such as a transformer in a cooling fluid filled tank which has been divided into a plurality of substantially independent compartments. This division may be achieved by positioning baffle means formed with apertures receiving the transformer, such baffle means substantially isolating portions of the transformer windings in the compartments it creates in the tank. In order to provide for more efficient cooling, the transformer coils may be divided into subwindings to permit the baffle means to engage the core, this construction allowing circulation of the cooling fluid between the baffle means and the subwindings and through cooling ducts in the subwindings. Means for circulating cooling fluid are preferably positioned adjacent to the tank and in one embodiment of the invention, such cooling means takes the form of individual radiators for each compartment.

In another embodiment of the invention, single radiators are provided to cool fluid from all compartments of the tank and manifold means employed to circulate the cooling fluid independently through such compartments.

Figure 2:
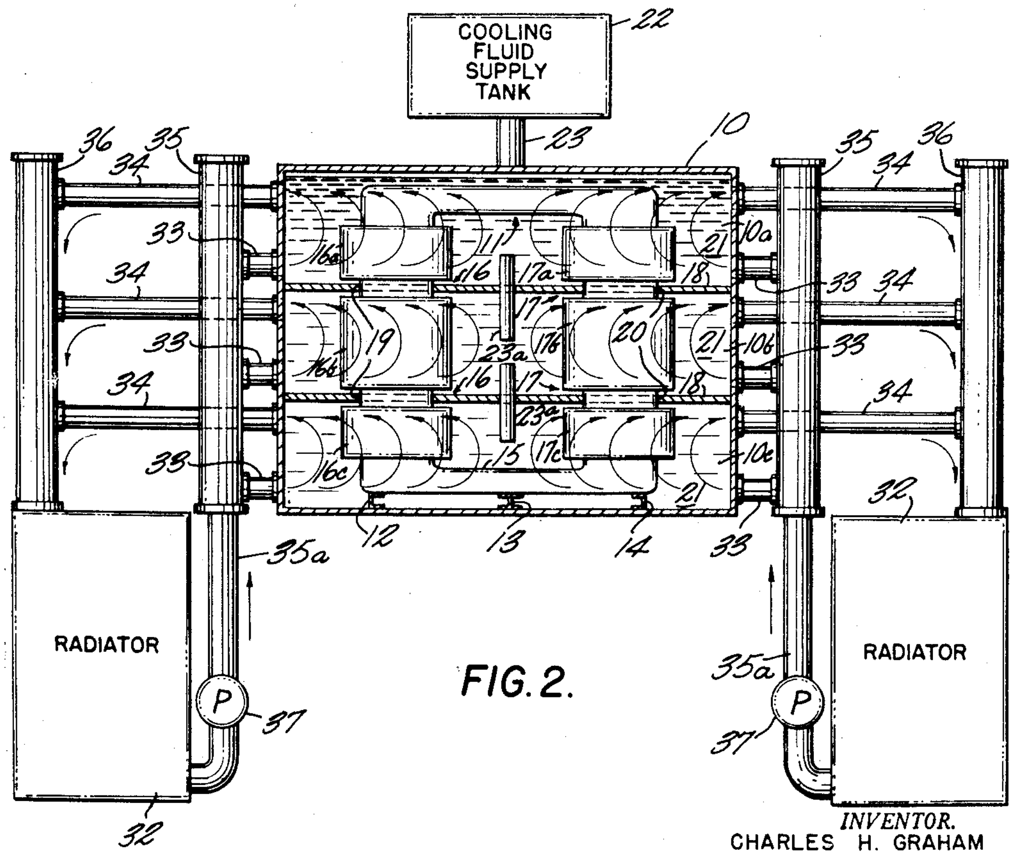

These and further objects and advantages of the invention will be more readily understood when the following description is read in connection with the accompanying drawings in which:

Figure 1 is an elevation, partly schematic and partly broken away, of a cooling system for a transformer in accordance with the present invention; and Figure 2 is an elevation similar to Figure 1 illustrating a further cooling system in accordance with the invention.

Referring to an illustrative embodiment of the invention in detail with particular reference to Figure 1, a conventional tank 10 of any suitable configuration encloses a transformer 11 mounted on supporting beams 12, 13 and 14. The transformer 11 comprises a core 15 carrying primary and secondary coils 16 and 17, respectively, divided into subwindings **16*a*, 16*b* and 17*a*, 17*b***, respectively, and preferably formed with vertical cooling ducts (not shown). In the interests of simplicity, the electrical input, output and interconnecting leads are not shown in Figure 1.

To divide the tank 10 into substantially independent compartments **10*a* and 10*b*, a horizontally oriented baffle 18 is joined in any suitable manner to the sidewalls of the tank 10, the baffle 18 being provided with apertures 19 and 20 through which the exposed portions of the core 15 between the subwindings 16*a*, 16*b* and 17*a*, 17*b*** extend.

The compartments **10*a* and 10*b* contain cooling fluid 21 such, for example, as conventional transformer cooling oil. In order to provide for expansion of the cooling fluid 21, a cooling fluid supply tank 22, positioned above the tank 10, may be joined by a pipe 23 to the compartment 10*a* to function as a reservoir. In addition, a further pipe 23*a* extends through the baffle plate 18, preferably terminating in the compartments 10*a* and 10*b* at points of equal cooling fluid temperature, to accommodate expansion of the cooling fluid 21 in the compartment 10*b*. It will be understood that the independence of the compartments 10*a* and 10*b* is substantially unaffected by the pipe 23*a* since it is positioned and shaped to preclude any sensible circulation of the cooling fluid 21 therethrough. Thus, a conventional S-shaped heat trap may be placed in the pipe 23*a*** to make certain that any flow therethrough due to temperature differences in the tank compartments will be prevented.

A pair of radiators 24 and 25 are positioned adjacent to each end of the tank 10 and joined thereto by pipes 26, 27 and 28, 29, respectively. Interposed in the pipes 27 and 29 are pumps 30 and 31, respectively, to circulate the cooling fluid 21 as indicated by the arrows in Figure 1. Of course, the pumps 30 and 31 may be omitted and gravity flow of the cooling fluid 21 relied upon. Thus, the fluid 21 in the compartments **10*a* and 10*b* will heat up and rise while such fluid in the radiators 24 and 25 will cool off and fall, the resulting circulation effectively cooling the windings 16 and 17. The radiators 24 and 25** may comprise conventional structures which may be either air-cooled or water-cooled, for example.

Considering the operation of the embodiment of the invention illustrated in Figure 1, the pumps 30 and 31 are energized to circulate the cooling fluid 21 through the compartments **10*a* and 10*b*, this action effectively cooling the subwindings 16*a*, 16*b* and 17*a*, 17*b*, as well as the core 15. Due to the fact that the cooling fluid 21 need only traverse these relatively short subwindings, it will not absorb enough heat during its circulation to cause it to reach an excessive temperature at, for example, the portion of the winding 17*b* adjacent to the baffle 18. Of course, it will be apparent that if the baffle were omitted and the cooling fluid 21 circulated along the entire length of the winding 17**, its temperature, when it reached the top of the winding, would be substantially greater than it would be in the present instance. Therefore, it is apparent that cooling the transformer 11 as shown in Figure 1 permits a substantially increased power rating therefor, all other factors remaining equal.

By spacing the subwindings 17a and 17b along the core 15, it is apparent that the cooling fluid 21 is permitted to circulate between the subwindings and the baffle 18, and this also aids in effectively cooling the transformer 11. Of course, the coils 16 and 17 could be unitary windings with the baffle 18 engaging them to provide the compartments 10a and 10b.

It is evident that a change in the volume of the cooling fluid 21 in the tank 10 due to its varying temperature will be permitted through the pipes 23 and 23a by virtue of the cooling fluid supply tank 22.

Referring to Figure 2 in which elements similar to those found in Figure 1 are designated by like reference numerals, the tank 10 mounts a pair of horizontally oriented baffles 18 to provide compartments 10a, 10b and 10c. Accordingly, the primary and secondary coils 16 and 17, respectively, of the transformer 11 are divided into subwindings 16a, 16b, 16c and 17a, 17b, 17c, respectively. As described in connection with Figure 1, the baffles 18 are provided with apertures 19 and 20 to receive the exposed portions of the core 15 between the various subwindings.

In addition to the greater number of compartments in the tank 10, the embodiment of Figure 2 differs from that shown in Figure 1 by employing modified cooling means for the cooling fluid 21. Thus, single large radiators 32 are provided adjacent to each end of the tank 10 and communicate with the compartments 10a, 10b and 10c through pipes 33 and 34 extending horizontally to manifolds 35 and 36. Supply pipes 35a feed the manifolds 35 from the radiators 32, pumps 37 being provided in the supply pipes 35 to circulate the cooling fluids 21 as indicated by the arrows shown in Figure 2. Of course, gravity circulation as discussed in connection with Figure 1 may also be employed in this embodiment of the invention.

The operation of the embodiment of the invention illustrated in Figure 2 is substantially the same as that described in connection with Figure 1, the greater number of compartments in the tank 10 permitting the use of a transformer 11 having smaller primary and secondary coils 16 and 17 as well as a smaller core 15. Alternatively, the power rating of the transformer 11 may be substantially increased over a similarly sized conventionally cooled transformer. Obviously, any desired number of compartments could be employed for cooling transformer coils of any desired size.

Accordingly, it is apparent that the improved cooling apparatus in accordance with the principles of the present invention lowers the maximum temperature of the cooling fluid in comparison with a conventional system which generates the same amount of heat. Accordingly, when such apparatus is employed, the hottest spot on the electrical windings is much cooler, and if the transformer is operated so that the hottest spot is as great as that in a conventional system, the power handling capacity of the electrical structure will be greatly increased.

While the present invention has been described in connection with the cooling of a transformer employing single primary and seconary windings, it is evident that cooling of transformers having any number of windings may be accomplished in accordance with the invention. For simplicity, the transformer windings have been termed primary and secondary windings and it should be understood that these terms include one or more input and output windings. In addition, it will be apparent that the cooling of other similar electrical apparatus such as large inductors is included within the scope of the present invention. Moreover, it will be understood that the above-described embodiments of the invention are illustrative only and modifications thereof will occur to those skilled in the art. Therefore, the invention is not to be limited to the specific apparatus disclosed herein but is to be defined by the appended claims.

I claim:

1. In a cooling system for electrical apparatus which includes at least one power carrying coil, a tank containing the apparatus, means for dividing the tank into a plurality of substantially independent compartments, at least a portion of the coil being positioned in each of said compartments, cooling fluid in each of said compartments, cooling means associated with the tank, and means for independently circulating the cooling fluid in each of the compartments and through the cooling means.

2. In a cooling system for electrical apparatus including at least one power carrying winding on a core, a tank containing the apparatus, means for dividing the tank into a plurality of substantially independent compartments, the winding being divided into subwindings and spaced on the core to position a subwinding in each of said compartments, cooling fluid in each of said compartments, cooling means exterior to the tank, and means for independently circulating the cooling fluid in each of the compartments and through the cooling means.

3. In a cooling system for electrical induction apparatus formed of first and second windings on a core, a tank enclosing the electrical induction apparatus, each of the first and second windings being respectively divided into a pair of spaced subwindings on the core, a baffle dividing the tank into two substantially independent compartments, apertures in said baffle for receiving portions of the core exposed between said subwindings, cooling fluid in each of said compartments, cooling means adjacent to said tank, and means for independently circulating the cooling fluid in each of said compartments and through the cooling means.

4. A system as defined in claim 3 wherein said cooling means comprises radiator means for each of said compartments.

5. A system as defined in claim 3 in which a pressure equalizing passage is provided between said compartments, and a cooling fluid reservoir communicates with one of said compartments.

6. In a cooling system for electrical induction apparatus formed of at least one power carrying winding on a core, a tank enclosing the apparatus, the winding being divided into subwindings spaced along the core, baffle means for dividing the tank into a plurality of substantially independent compartments, apertures in said baffle means for receiving portions of the core exposed between the subwindings to position one subwinding in each of said compartments, cooling fluid in each of said compartments, cooling means adjacent to said tank, and means for independently circulating the cooling fluid in each of said compartments and through the cooling means.

7. A system as defined in claim 6 wherein said cooling means comprises at least one radiator adjacent to the tank, and manifold means joining said compartments to said radiator.

8. A system as defined in claim 6 in which pressure equalizing passage means are provided between adjacent compartments, and a cooling fluid reservoir communicates with one of said compartments.

References Cited in the file of this patent

UNITED STATES PATENTS

| | | |
|---|---|---|
| 1,543,546 | Burnham | June 23, 1925 |
| 2,388,565 | Paluev | Nov. 6, 1945 |
| 2,479,373 | Knotts et al. | Aug. 16, 1949 |

FOREIGN PATENTS

| | | |
|---|---|---|
| 648,697 | Great Britain | Jan. 10, 1951 |
| 648,736 | Great Britain | Jan. 10, 1951 |